United States Patent
Hashizume et al.

(10) Patent No.: US 6,934,918 B2
(45) Date of Patent: Aug. 23, 2005

(54) IP (INTELLECTUAL PROPERTY) GENERATING SYSTEM

(75) Inventors: Takeshi Hashizume, Tokyo (JP); Kumiko Tsujihashi, Tokyo (JP)

(73) Assignee: Renesas Technology Corporation, Tokyo (JP)

( * ) Notice: Subject to any disclaimer, the term of this patent is extended or adjusted under 35 U.S.C. 154(b) by 80 days.

(21) Appl. No.: 10/441,221

(22) Filed: May 20, 2003

(65) Prior Publication Data

US 2004/0068557 A1 Apr. 8, 2004

(30) Foreign Application Priority Data

Oct. 2, 2002 (JP) ........................................ 2002-290276

(51) Int. Cl.$^7$ .............................................. G06F 17/50
(52) U.S. Cl. .......................................... 716/1; 709/201
(58) Field of Search ............................... 716/1, 2, 3, 4; 709/223, 201; 703/28

(56) References Cited

U.S. PATENT DOCUMENTS 6,678,874 B1 * 1/2004 Jochym et al. ................ 716/11

2002/0059053 A1 * 5/2002 Akita ........................... 703/13
2002/0073374 A1 * 6/2002 Danialy et al. .............. 714/738

FOREIGN PATENT DOCUMENTS

| EP | 1288819 A1 * | 3/2003 | ........... G06F/17/60 |
| JP | 2000-305970 A | 11/2000 | |
| JP | 2001-331537 A * | 11/2001 | ........... G06F/17/60 |

* cited by examiner

*Primary Examiner*—Stacy A. Whitmore
*Assistant Examiner*—Sun James Lin
(74) *Attorney, Agent, or Firm*—Burns, Doane, Swecker & Mathis, LLP (57) ABSTRACT

An IP generating system includes an IP (Intellectual Property) providing apparatus and at least one development apparatus. The IP providing apparatus searches for a development apparatus installing a memory compiler to be revised with reference to applied condition data managed by a master database, and transmits the revision information as to the memory compiler to the development apparatus. The system can revise the memory compiler without requiring a user to make a decision as to the necessity of the revision of the memory compiler.

11 Claims, 10 Drawing Sheets

| # | name | mail-address | company | cellname | bit | word | cpb | bwm | oec | version |
|---|---|---|---|---|---|---|---|---|---|---|
| 0001 | xxx | xxx@aaa.com | AAA | RAM1 | 32 | 512 | 8 | 1 | 0 | 2002.07.b |
| 0002 | ppp | xxx@aaa.com | AAA | RAM2 | 16 | 256 | 4 | 1 | 0 | 2002.07.b |
| 0003 | yyy | yyy@ggg.com | GGG | R08128 | 8 | 128 | 4 | 0 | 1 | 2002.01.a |
| 0004 | zzz | zzz@kkk.com | kkk | MEM001 | 16 | 256 | 4 | 1 | 1 | 2002.07.b |

FIG.3

| Version | CONTENTS TO BE REVISED | RELATED OPTION |
|---|---|---|
| 2002.07.b | FAILURE IN BWM CONTROL CIRCUIT | bwm |
| 2002.08.a | FAILURE IN TIMING VALUES BETWEEN OEC AND DO | oec |

REQUIREMENT INPUT FORM:
PLEASE SELECT OR DESCRIBE NECESSARY FUNCTIONS.

REDUNDANCY CIRCUIT  ☑ NECESSARY  ☐ USE IF PRESENT  ☐ UNNECESSARY

TEST CIRCUIT  ☐ BIST  ☑ BYPASS (MUX)  ☑ SCANNING

ADDITIONAL REQUIREMENTS:

USER ID: [    ]   PASSWORD: [    ]

[TRANSMIT]  [CLEAR]

THANK YOU FOR YOUR COOPERATION.

| No. | cellname | bit | word | cpb | bwm | oec | version | date | op |
|---|---|---|---|---|---|---|---|---|---|
| 0001 | RAM1 | 32 | 512 | 8 | 1 | 0 | 2002.07.b | 02/07/8 | ○ |
| 0002 | RAM2 | 16 | 256 | 4 | 1 | 0 | 2002.07.b | 02/07/5 | ● |
| 0003 | R08128 | 32 | 128 | 4 | 0 | 0 | 2002.01.a | 02/01/2 | ● | submit

AFTER DEPRESSING "submit"

FIG.12B

| cellname | bit | word | cpb | bwm | oec |
|---|---|---|---|---|---|
| RAM2 | 16 | 256 | 4 | 1 | 0 |
| R08128 | 32 | 128 | 4 | 0 | 0 | submit

MODIFY IN PART AND CARRY OUT GENERATION

FIG.12C

| cellname | bit | word | cpb | bwm | oec |
|---|---|---|---|---|---|
| RAM2 | 16 | 256 | 4 | 1 | 0 |
| R08128 | 16 | 128 | 4 | 0 | 0 | submit

FIG.13 (PRIOR ART)

IP (INTELLECTUAL PROPERTY) GENERATING SYSTEM

BACKGROUND OF THE INVENTION

1. Field of the Invention

The present invention relates to an IP (Intellectual Property) generating system capable of revising an IP generating means as needed.

2. Description of Related Art

Figure 13:
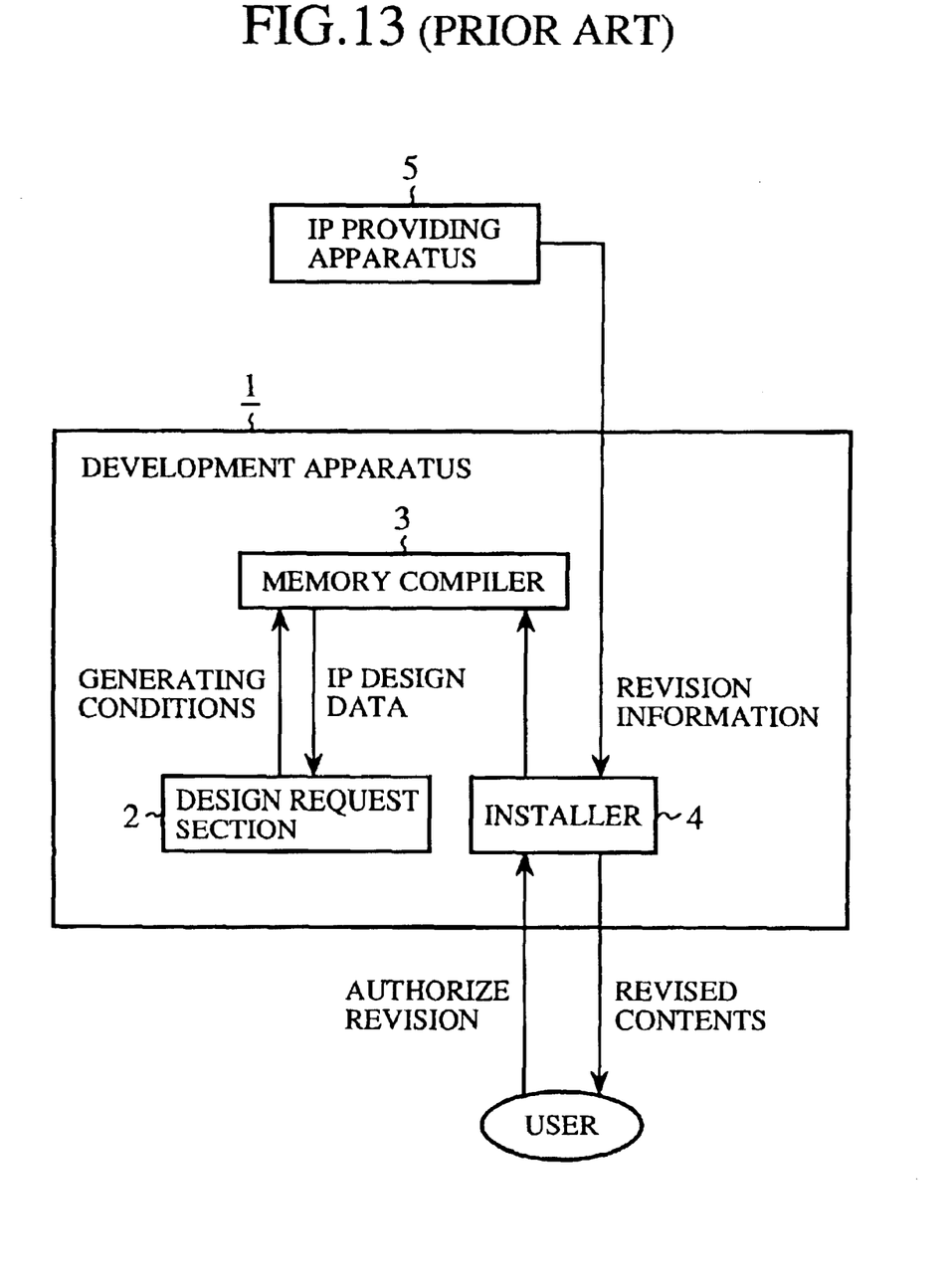
FIG. 13 is a block diagram showing a configuration of a conventional IP generating system.

FIG. 13 is a block diagram showing a configuration of a conventional IP generating system. In FIG. 13, the reference numeral 1 designates a development apparatus such as an EWS (engineering work station) a user employs to design placement and routing of memory cells to be mounted on a system LSI. The reference numeral 2 designates a design request section for providing a memory compiler 3 with generating conditions of IP design data, such as a bit width and word width of the memory cells, the presence or absence of BWM (Bit Write Mask) control and the presence or absence of output control. The IP design data includes layout data of the memory cells, simulation data, and a data sheet. In addition, the term IP (Intellectual Property) refers to design resources.

The reference numeral 3 designates the memory compiler for generating the IP design data according to the generating conditions of the IP design data supplied from the design request section 2; and 4 designates an installer for installing the memory compiler 3 developed by an IP providing apparatus 5 into the development apparatus 1. The installer 4, receiving revision information as to the memory compiler 3 from the IP providing apparatus 5, revises the memory compiler 3 according to the revision information under the control of the user. The reference numeral 5 designates the IP providing apparatus for providing the development apparatus 1 with the revision information as to the memory compiler 3, when a failure or the like of the memory compiler 3 is detected after the development of the memory compiler 3, and when improvement or revision is carried out.

Next, the operation of the conventional IP generating system will be described.

First, when developing a new memory compiler 3, the IP providing apparatus 5 transmits an install program of the memory compiler 3 to the development apparatus 1 used by the user via the Internet or telephone circuit.

Receiving the install program of the memory compiler 3 from the IP providing apparatus 5, the installer 4 of the development apparatus 1 installs the memory compiler 3 into the development apparatus 1 in accordance with the install program.

When the user wishes to generate IP design data after the memory compiler 3 is installed into the development apparatus 1, he or she operates the design request section 2 to input the generating conditions of the IP design data, thereby supplying the generating conditions to the memory compiler 3.

Receiving the generating conditions of the IP design data from the design request section 2, the memory compiler 3 generates the IP design data in accordance with the generating conditions.

The generating conditions of the IP design data include the bit width and word width of the memory cells, the presence or absence of the BWM control and the presence or absence of the output control. The IP design data includes the layout data about the memory cells, simulation data, data sheet and so forth.

The IP providing apparatus 5 transmits the revision information as to the memory compiler 3 to the development apparatus 1 when a failure is detected in the memory compiler 3 offered to the user, or when any addition or alternation of a function is made to the memory compiler 3.

Receiving the revision information as to the memory compiler 3 from the IP providing apparatus 5, the installer 4 of the development apparatus 1 displays the contents of the revision.

The user of the development apparatus 1 makes a decision as to whether the revision of the memory compiler 3 is necessary or not referring to the contents of the revision, and when it is necessary, the user authorizes the installer 4 to revise the memory compiler 3.

For example, the user decides that the revision is necessary when the contents of the revision of the memory compiler 3 indicate an alteration or defect of a function that has been used. In contrast, when the contents indicate the alteration or defect of a function that has not been used and will not be used from that time on, the user makes a decision that the revision is unnecessary.

Being authorized by the user, the installer 4 of the development apparatus 1 revises the memory compiler 3 in accordance with the revision information.

With the foregoing configuration, the conventional IP generating system requires the user to decide the need for the revision of the memory compiler 3 when the revision information as to the memory compiler 3 is received from the IP providing apparatus 5. Thus, it has a problem of imposing a heavy burden on the user.

SUMMARY OF THE INVENTION

The present invention is implemented to solve the foregoing problem. It is therefore an object of the present invention to provide an IP generating system capable of carrying out appropriate revision of the memory compiler (IP generating means) without requiring the user to make a decision as to the necessity of the revision of the memory compiler.

According to one aspect of the present invention, there is provided an IP generating system that referring to applied condition data managed by a managing means, searches for a development apparatus installing an IP generating means such as a memory compiler to be revised, and transmits the revision information associated with the IP generating means to the development apparatus. The system offers an advantage of being able to revise the IP generating means without requiring a user to make a decision as to the necessity of the revision of the IP generating means.

DETAILED DESCRIPTION OF THE PREFERRED EMBODIMENTS

The invention will now be described with reference to the accompanying drawings.

Embodiment 1

Figure 1:
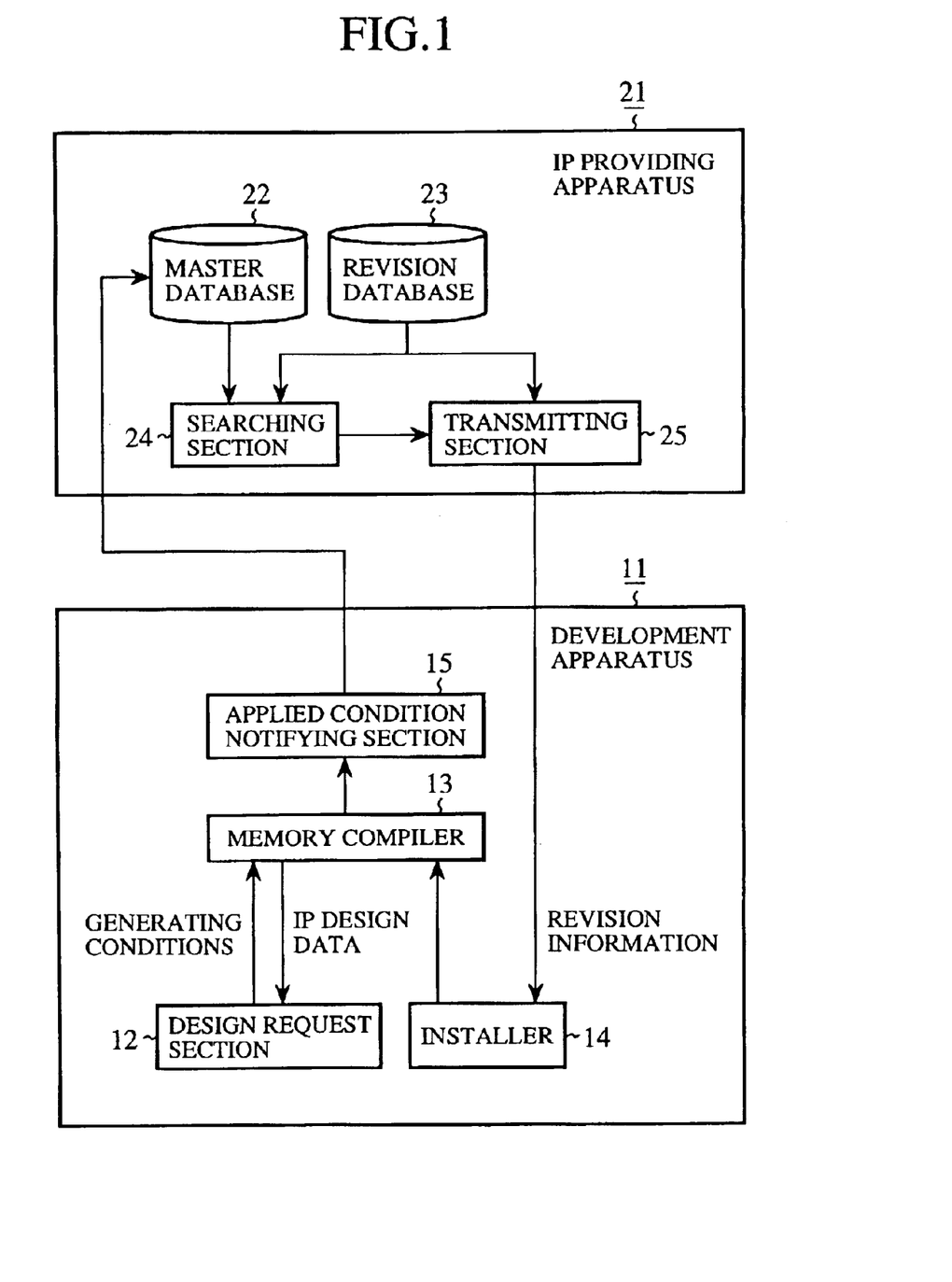
FIG. 1 is a block diagram showing a configuration of an embodiment 1 of the IP generating system in accordance with the present invention.

FIG. 1 is a block diagram showing a configuration of an embodiment 1 of the IP generating system in accordance with the present invention. In FIG. 1, the reference numeral 11 designates a development apparatus such as an EWS (engineering work station) a user employs to design placement and routing of memory cells to be mounted on a system LSI. The reference numeral 12 designates a design request section for providing a memory compiler 13 with generating conditions of IP design data, such as a bit width and word width of the memory cells, the presence or absence of BWM (Bit Write Mask) control and the presence or absence of output control. The IP design data includes layout data of the memory cells, simulation data, and data sheet. Here, IP (Intellectual Property) refers to design resources.

The reference numeral 13 designates the memory compiler (IP generating means) for generating the IP design data according to the generating conditions of the IP design data supplied from the design request section 2. Although it is assumed that the IP generating means consists of the memory compiler 13 here, this is not essential. For example, the IP generating means may be a program compiler.

The reference numeral 14 designates an installer for installing the memory compiler 13 developed by an IP providing apparatus 21 into the development apparatus 11. The installer 14, receiving revision information as to the memory compiler 13 from the IP providing apparatus 21, revises the memory compiler 13 according to the revision information under the control of the user. The reference numeral 15 designates an applied condition notifying section for transmitting applied condition data indicating the applied condition of the memory compiler 13 to the IP providing apparatus 21.

The reference numeral 21 designates the IP providing apparatus for providing the development apparatus 11 with the revision information as to the memory compiler 13 when a failure or the like of the memory compiler 13 is detected after the development of the memory compiler 13, or when improvement or revision is carried out. The reference numeral 22 designates a master database for managing the applied condition data transmitted from the development apparatus 11; 23 designates a revision database for storing the revision information as to the memory compiler 13; 24 designates a searching section for searching for the development apparatus 11 which installs the memory compiler 13 to be revised, referring to the applied condition data managed by the master database 22; and 25 designates a transmitting section for transmitting the revision information as to the memory compiler 13 to the development apparatus 11 the searching section 24 searched for.

Next, the operation of the present embodiment 1 will be described.

First, when developing a new memory compiler 13, the IP providing apparatus 21 transmits an install program of the memory compiler 13 to the development apparatus 11 employed by the user via the Internet or telephone circuit. Although only one development apparatus 11 is connected to the IP providing apparatus 21 in the example of FIG. 1, a plurality of development apparatuses 11 are usually connected to the IP providing apparatus 21. Accordingly, the IP providing apparatus 21 transmits the install program of the memory compiler 13 to the plurality of development apparatuses 11.

Receiving the install program of the memory compiler 13 from the IP providing apparatus 21, the installer 14 of the development apparatus 11 installs the memory compiler 13 into the development apparatus 11 in accordance with the install program.

When the user wishes to generate IP design data after the memory compiler 13 is installed into the development apparatus 11, he or she operates the design request section 12 to input the generating conditions of the IP design data, thereby supplying the generating conditions to the memory compiler 13.

Receiving the generating conditions of the IP design data from the design request section 12, the memory compiler 13 generates the IP design data in accordance with the generating conditions.

The generating conditions of the IP design data include the bit width and word width of the memory cells, the presence or absence of the BWM control and the presence or absence of the output control. The IP design data includes the layout data about the memory cells, simulation data, data sheet and so forth.

The applied condition notifying section 15 of the development apparatus 11 transmits the applied condition data indicating the applied condition of the memory compiler 13 to the IP providing apparatus 21 every time the memory compiler 13 generates the IP design data.

Receiving the applied condition data from the development apparatus 11, the master database 22 of the IP providing apparatus 21 registers the applied condition data to manage them. The applied condition data managed by the master database 22 are concealed from the public.

Figures 2, 3:
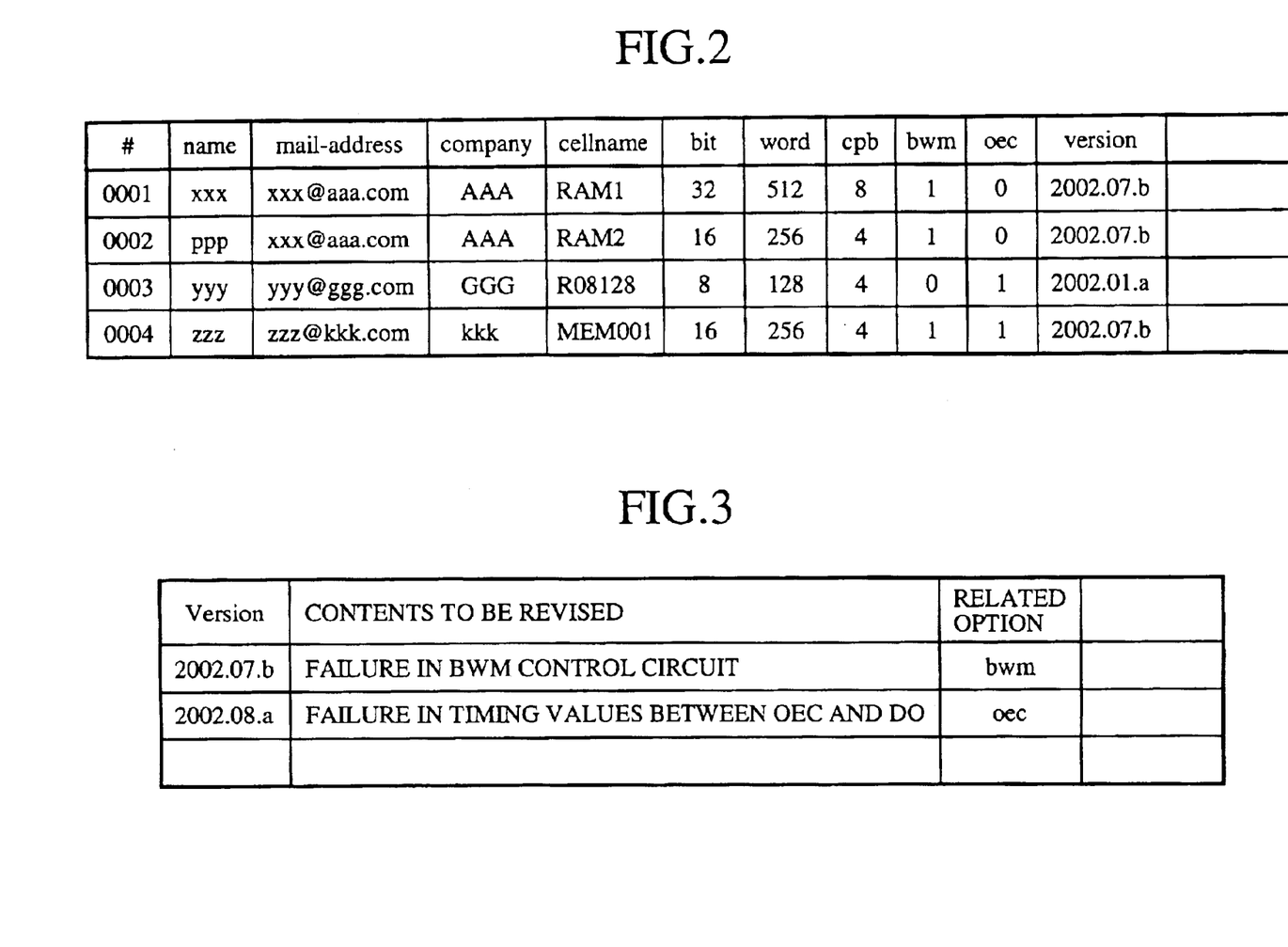
FIG. 2 is a table illustrating applied condition data a master database manages.
FIG. 3 is a table illustrating revision information as to a memory compiler a revision database stores.

FIG. 2 is a table illustrating an example of the applied condition data the master database 22 manages. In FIG. 2, "name" and "company" designate information about users using the development apparatus 11; "mail-address" designates mail addresses of the development apparatuses 11; and "bit", "word", "cpb", "bwm", "oec" and "version" designate information about the applied conditions (generating results) of the memory compiler 13. As to the registration number #0001, for example, the list indicates that the bit width is 32, the word width is 512, the cpb is eight, the BWM control is present, and the output control (OECcontrol) is absent.

Incidentally, "1" in the "bwm" and "oec" indicates the presence of the control, whereas "0" indicates the absence of the control.

When a defect is detected in the memory compiler 13 offered to the user, or when an alteration or revision of a function is carried out, the IP provider stores the revision information as to the memory compiler 13 into the revision database 23 of the IP providing apparatus 21.

FIG. 3 is a table illustrating an example of the revision information as to the memory compiler 13 to be stored in the revision database 23. For example, the revision information with the version "2002.07.b" indicates that it relates to the revision of the BWM control of the memory compiler 13, and the revision information with the version "2002.08.a" indicates that it relates to the revision of the OEC control of the memory compiler 13.

When the revision database 23 stores the revision information as to the memory compiler 13, the searching section 24 of the IP providing apparatus 21 searches for the development apparatus 11 installing the memory compiler 13 to be revised with reference to the applied condition data managed by the master database 22.

For example, when the revision database 23 stores the revision information about the version "2002.07.b", the searching section 24 search for the development apparatus 11 installing the memory compiler 13 having the information that the BWM control is present, referring to the applied condition data managed by the master database 22. In the example of FIG. 2, since the development apparatuses 11 with the registration numbers of the applied condition data #0001, #0002 and #0004 include the memory compilers 13 that have information that the BWM control is present, the mail addresses "mail-address" of these development apparatuses 11 are supplied to the transmitting section 25.

Receiving the mail addresses "mail-address" of the development apparatuses 11 from the searching section 24, the transmitting section 25 of the IP providing apparatus 21 transmits the revision information as to the memory compiler 13 to the development apparatuses 11.

For example, when the revision information with the version "2002.07.b" is stored in the revision database 23, the searching section 24 outputs the mail addresses of the development apparatuses 11, the users of which are "xxx", "ppp" and "zzz". Thus, although the revision information as to the memory compiler 13 is transmitted to the development apparatuses 11 whose users are "xxx", "ppp" and "zzz", it is not transmitted to the development apparatus 11 whose user is "yyy".

Receiving the revision information as to the memory compiler 13 from the IP providing apparatus 21, the installer 14 of the development apparatus 11 revises the memory compiler 13 in accordance with the revision information.

Since revision information as to the memory compiler 13 is not transmitted to the development apparatus 11 whose user is "yyy", its installer 14 does not revise the memory compiler 13. The reason for this is that since its memory compiler 13 has no BWM control, it is not necessary to carry out the revision associated with the BWM control.

In contrast, the development apparatuses 11 whose users are "xxx", "ppp" and "zzz" revise the memory compiler 13. When the IP design data the memory compiler 13 has generated must be revised because of the revision of the memory compiler 13, the memory compiler 13 after the revision regenerates the IP design data. For example, when the memory compiler 13 is revised because of a defect, it is very likely that the IP design data the memory compiler 13 has generated has a defect as well. Accordingly, the revised memory compiler 13 must generate the IP design data again. In contrast, when the memory compiler 13 is revised to add a function, it is unlikely that the IP design data the memory compiler 13 has generated has a defect. Consequently, the memory compiler 13 after the revision need not generate the IP design data again.

As described above, the present embodiment 1 is configured such that it searches for the development apparatuses 11 installing the memory compiler 13 to be revised, referring to the applied condition data the master database 22 manages; and transmits the revision information as to the memory compiler 13 to the development apparatuses 11. Thus, the present embodiment 1 offers an advantage of being able to carry out the revision of the memory compiler 13 appropriately without requiring the user to make a decision as to the necessity for the revision of the memory compiler 13.

Although the foregoing description makes no specific mention, the IP provider can refer to the applied condition data managed by the master database 22 to carry out the revision of the memory compiler 13. Referring to the applied condition data managed by the master database 22 enables the IP provider to learn the actual conditions of use of the users. Thus, the IP provider can recognize a function to be improved to satisfy the users in the process of development and improvement in the memory compiler 13.

Embodiment 2

Figure 4:
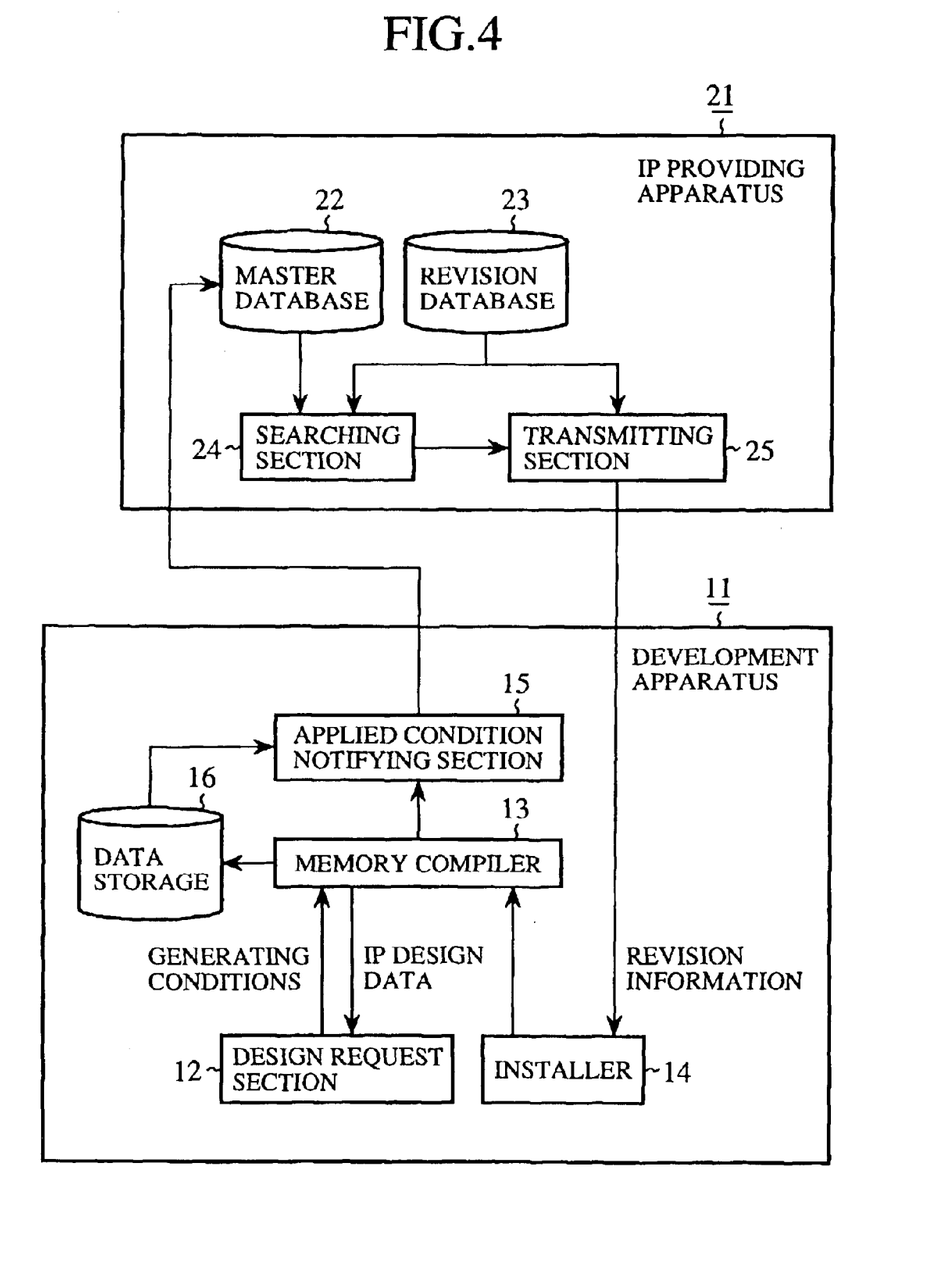
FIG. 4 is a block diagram showing a configuration of an embodiment 2 of the IP generating system in accordance with the present invention.

FIG. 4 is a block diagram showing a configuration of an embodiment 2 of the IP generating system in accordance with the present invention. In FIG. 4, the same reference numerals as those of FIG. 1 designate the same or like portions, and the description thereof is omitted here.

In FIG. 4, the reference numeral 16 designates a data storage for temporarily storing the applied condition data indicating the applied condition of the memory compiler 13.

In the foregoing embodiment 1, every time the memory compiler 13 generates the IP design data, the applied condition notifying section 15 transmits the applied condition data indicating the applied condition of the memory compiler 13 to the IP providing apparatus 21. However, this is not essential. For example, when the memory compiler 13 generates the IP design data, the data storage 16 can temporarily store the applied condition data indicating the applied condition of the memory compiler 13. Then, when the number of the stored applied condition data exceeds a specified number, or the duration of storing the applied condition data exceeds a specified time period, the applied condition notifying section 15 can transmit the applied condition data stored in the data storage 16 to the IP providing apparatus 21.

The present embodiment 2 offers an advantage of being able to transmit the applied condition data at a time when the traffic of the network such as the Internet is light. Furthermore, even if the network such as the Internet has a failure, the present embodiment 2 achieves an advantage of being able to store the applied condition data until the network recovers.

Embodiment 3

Figure 5:
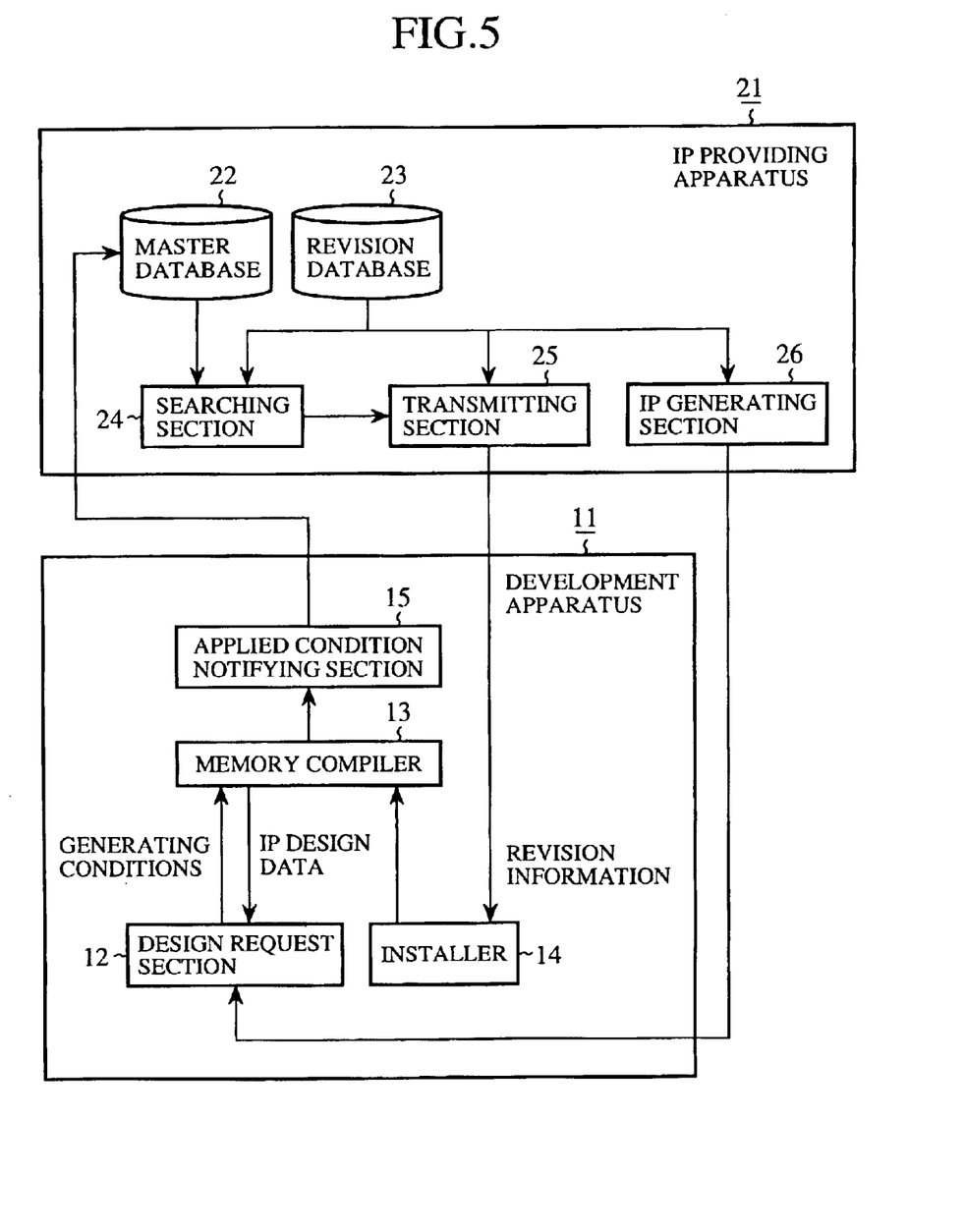
FIG. 5 is a block diagram showing a configuration of an embodiment 3 of the IP generating system in accordance with the present invention.

FIG. 5 is a block diagram showing a configuration of an embodiment 3 of the IP generating system in accordance with the present invention. In FIG. 5, the same reference numerals as those of FIG. 1 designate the same or like portions, and the description thereof is omitted here.

The reference numeral 26 designates an IP generating section (IP generating unit) that operates as follows. When the transmitting section 25 transmits the revision information as to the memory compiler 13 to the development apparatus 11, it is likely that the IP design data that can be affected by the revision of the memory compiler 13 is the data generated by the memory compiler 13 before the revision. In such a case, the IP generating section 26 generates the IP design data to be generated by the memory compiler 13 after the revision, and transmits the IP design data to the development apparatus 11.

After the installer 14 revises the memory compiler 13 in the foregoing embodiment 1, the user makes a decision as to whether the IP design data affected by the revision of the memory compiler 13 belongs to the IP design data that has already been generated, and when the IP design data affected by the revision has already been generated, the memory compiler 13 after the revision generates the IP design data again. In contrast, the present embodiment 3 is configured such that the IP providing apparatus 21 includes the IP generating section 26 for generating the IP design data affected by the revision of the memory compiler 13, and transmits the IP design data to the development apparatus 11.

For example, when the revision is carried out because the memory compiler 13 is defective, it is very likely that the IP design data that has already been generated also includes a defect. Thus, the IP generating section 26 that has the same function as the memory compiler 13 after the revision generates the IP design data and transmits the data to the development apparatus 11. In contrast, when there vision is carried out to add a function to the memory compiler 13, the IP generating section 26 does not generate the IP design data because the IP design data that has already been generated is unlikely to have a defect.

According to the present embodiment 3, it is not necessary for the user to makes a decision as to the need for generating the IP design data again. Thus, it offers an advantage of being able to further reduce the load imposed on the user, and to revise the IP design data affected by revision of the memory compiler 13 more quickly.

Embodiment 4

Figure 6:
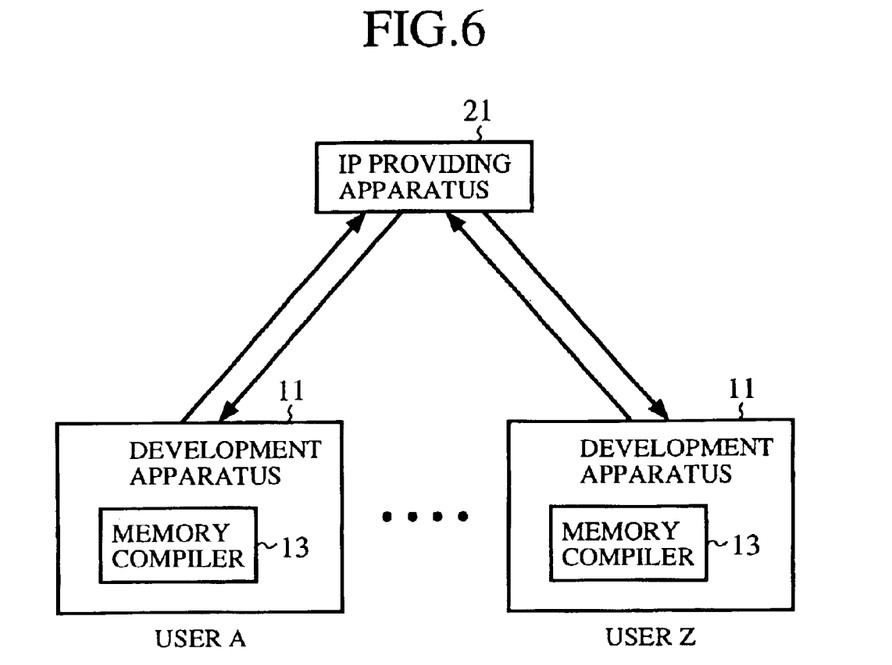
FIG. 6 is a block diagram showing a schematic configuration of the embodiments 1–3 of the IP generating system in accordance with the present invention.
Figure 7:
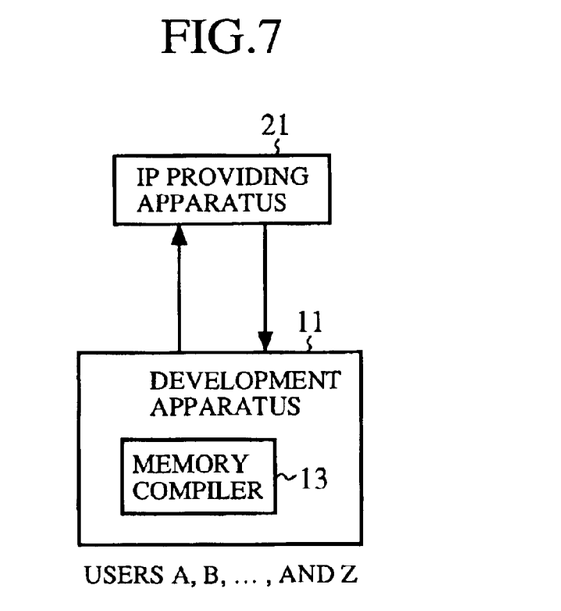
FIG. 7 is a block diagram showing a schematic configuration of an embodiment 4 of the IP generating system in accordance with the present invention.

Although the individual users employ their own memory compilers 13 in the foregoing embodiments 1–3 with one-to-one correspondence as shown in FIG. 6, this is not essential. For example, a plurality of users may share a single memory compiler 13 as shown in FIG. 7.

In this case, it is likely that a heavy load is imposed on the memory compiler 13, and hence delays the generating time of the IP design data. However, since the total number of the memory compilers 13 reduces, the memory compilers 13 can be revised more quickly.

Embodiment 5

Although the applied condition notifying section 15 transmits the applied condition data indicating the applied condition of the memory compiler 13 to the IP providing apparatus 21 in the foregoing embodiments 1–4, this is not essential. For example, such a configuration is possible in which when the design request section 12 receives the requirements of the user, the applied condition notifying section 15 transmits the requirement data indicating the requirements of the user to the IP providing apparatus 21 so that the master database 22 of the IP providing apparatus 21 manages the requirement data.

Figure 8:
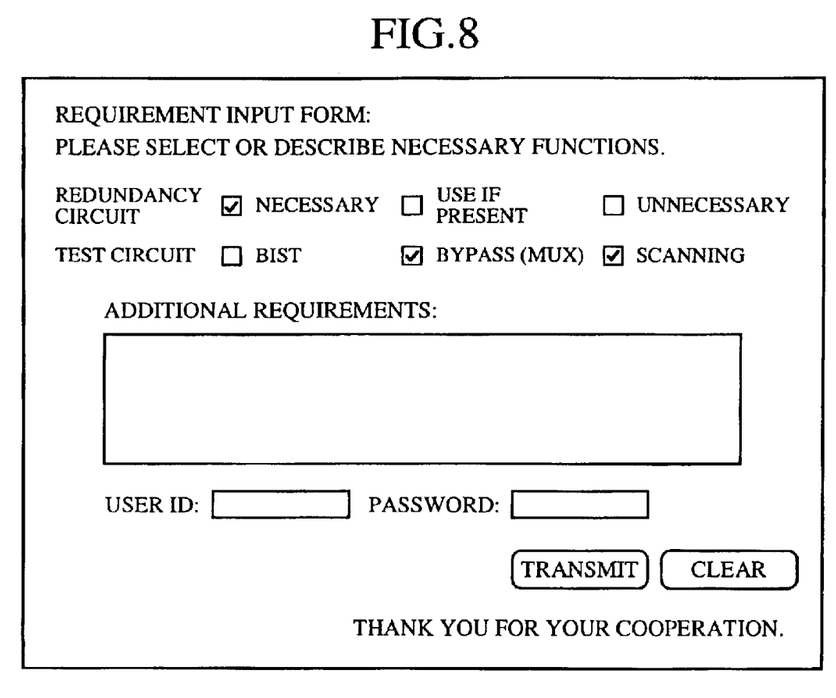
FIG. 8 is a diagram illustrating a requirement input form.

More specifically, when the design request section 12 displays a requirement input form as illustrated in FIG. 8, the user selects and enters functions and the like he or she needs into the requirement input form, thereby inputting the requirements.

When the design request section 12 receives the requirements of the user, the applied condition notifying section 15 transmits the requirement data indicating the requirements of the user to the IP providing apparatus 21.

Receiving the requirement data from the development apparatus 11, the master database 22 of the IP providing apparatus 21 manages the requirement data.

According to the present embodiment 5, the IP provider can utilize the requirements of the user as marketing information. Thus, it offers an advantage of enabling the IP provider to accurately reflect the user requirements when developing or improving the memory compiler 13.

Embodiment 6

Figure 9:
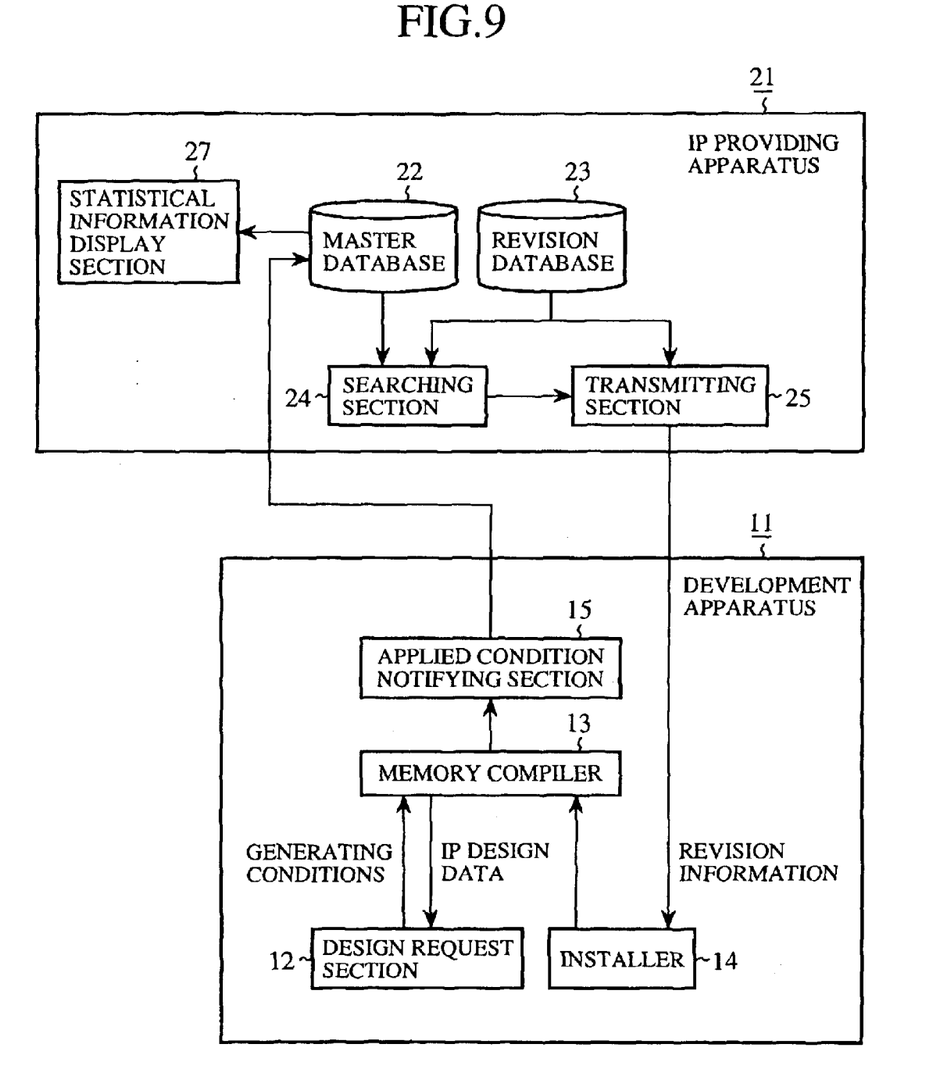
FIG. 9 is a block diagram showing a configuration of an embodiment 6 of the IP generating system in accordance with the present invention.

FIG. 9 is a block diagram showing a configuration of an embodiment 6 of the IP generating system in accordance with the present invention. In FIG. 9, the same reference numerals as those of FIG. 1 designate the same or like portions, and the description thereof is omitted here.

In FIG. 9, the reference numeral 27 designates a statistical information display section for carrying out statistical processing of the applied condition data or requirement data managed by the master database 22, and for displaying the results of the statistical processing.

The master database 22 manages the applied condition data and requirement data in the foregoing embodiment 5. In the present embodiment 6, the statistical information display section 27 carries out additional statistical processing of the applied condition data and/or requirement data managed by the master database 22, and displays its results.

For example, when the IP provider desires to carry out a survey of the generating range of the memory compiler 13, the statistical information display section 27 retrieves the information about the bit width and word width from the applied condition data managed by the master database 22.

Figure 10:
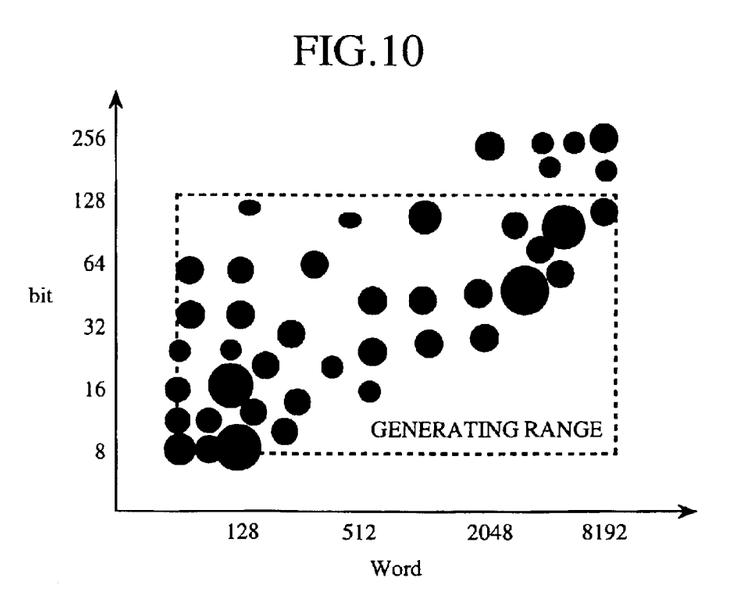
FIG. 10 is a two-dimensional graph representing a generating range of an IP generating means statistically.

Then, the statistical information display section 27 displays dots on a two-dimensional graph as illustrated in FIG. 10 in accordance with the retrieved information in such a manner that the dots occupy an increasing area in proportion to the actual numbers used.

The present embodiment 6 is configured such that the statistical information display section 27 carries out the statistical processing of the applied condition data and/or requirement data managed by the master database 22, and displays the results. Thus, it can recognize the current trends in use and requirements of the user for the memory compiler 13, thereby offering an advantage of being able to carry out the development and improvement of the memory compiler 13 that will be able to provide satisfaction to the users.

Incidentally, the size or color of the dots can be varied depending on the user to grasp the trend of the use and requirements of the individual users.

Embodiment 7

Figure 11:
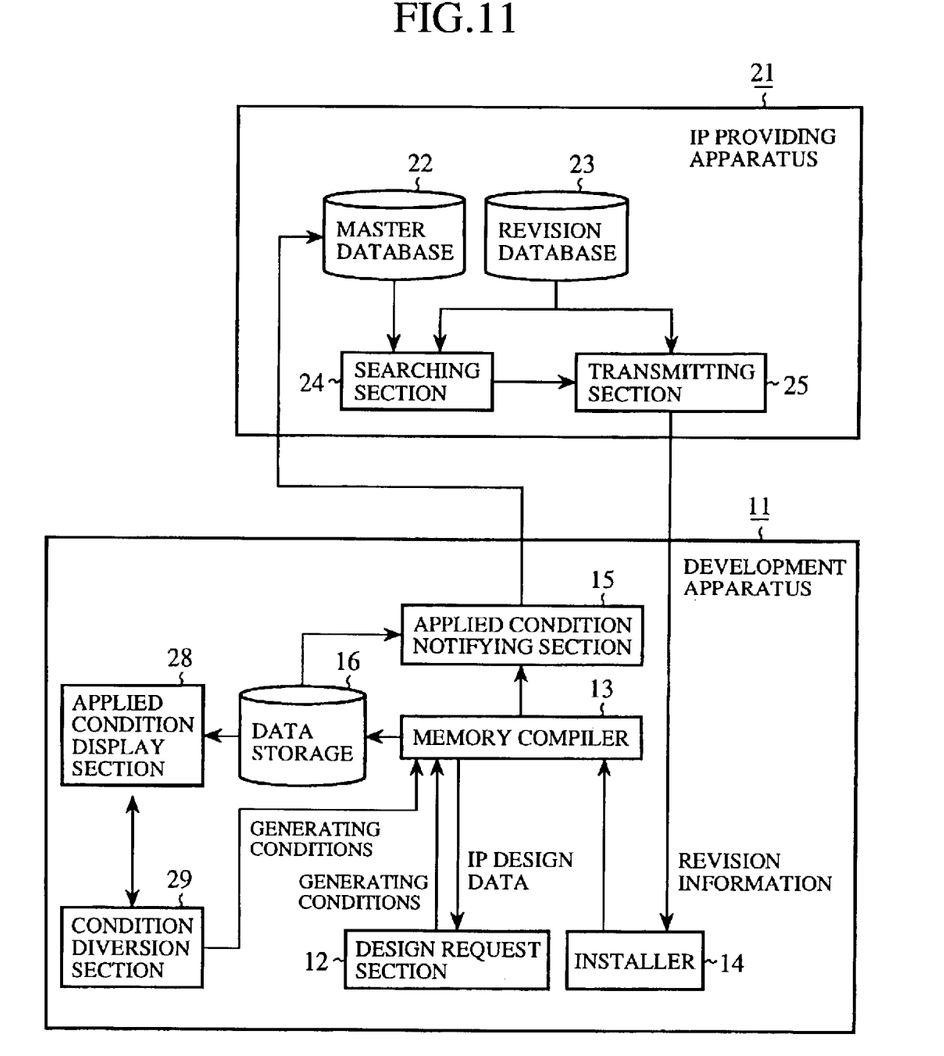
FIG. 11 is a block diagram showing a configuration of an embodiment 7 of the IP generating system in accordance with the present invention.

FIG. 11 is a block diagram showing a configuration of an embodiment 7 of the IP generating system in accordance with the present invention. In FIG. 11, the same reference numerals as those of FIG. 4 designate the same or like portions, and the description thereof is omitted here.

In FIG. 11, the reference numeral 28 designates an applied condition display section for displaying the applied condition data indicating the applied condition of the memory compiler 13; and 29 designates a condition diversion section for accepting any selection of the applied condition data from among the applied condition data the applied condition display section 28 displays, for accepting correction of the selected applied condition data, and for providing the memory compiler 13 with the corrected applied condition data as the generating conditions of the IP design data.

When the user wishes to generate the IP design data in the foregoing embodiments 1–6, he or she inputs the generating conditions of the IP design data by operating the design request section 12 to provide the generating conditions to the memory compiler 13. However, this is not essential. For example, such a configuration is also possible in which the user selects and corrects any applied condition data among the applied condition data stored in the data storage 16 to provide the corrected applied condition data to the memory compiler 13 as the generating conditions of the IP design data.

Figure 12A:
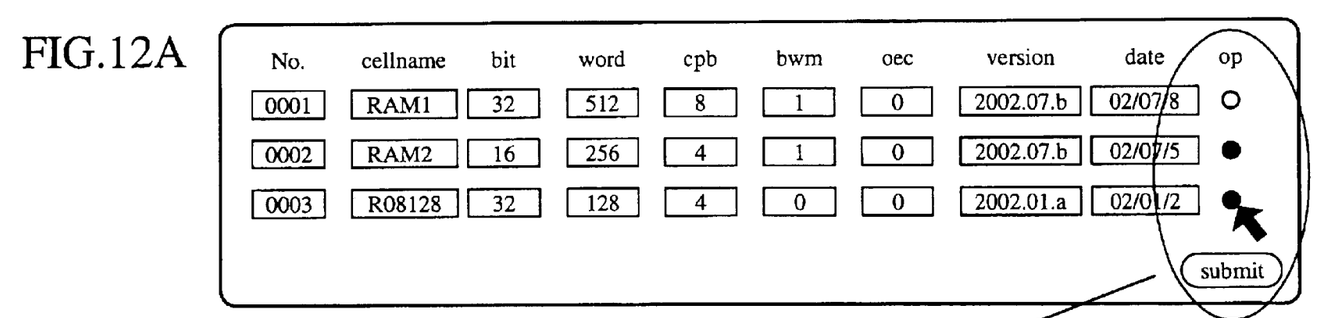
FIG. 12 is a diagram illustrating selection and revision of the applied condition data.

More specifically, when the user wishes to generate the IP design data, he or she operates the condition diversion section 29 to cause the applied condition display section 28 to display the applied condition data stored in the data storage 16 (see, FIG. 12(a)).

Figure 12B:
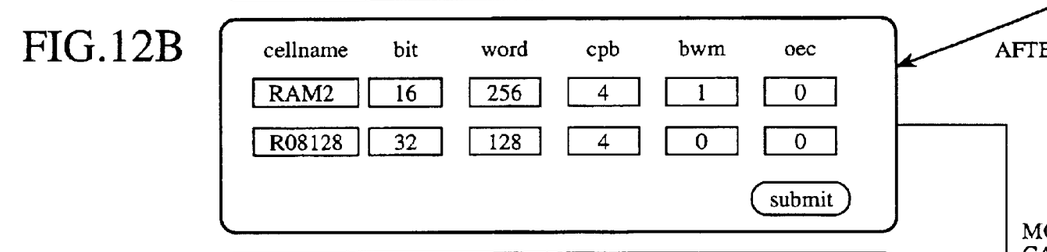

Subsequently, operating the condition diversion section 29, the user selects any desired applied condition data from among the applied condition data the applied condition display section 28 displays. In the example of FIG. 12(a), the user selects the desired applied condition data by entering a checkmark into check boxes of the applied condition data, and determines the selection by depressing the button "submit" (see, FIG. 12(b)).

Figure 12C:
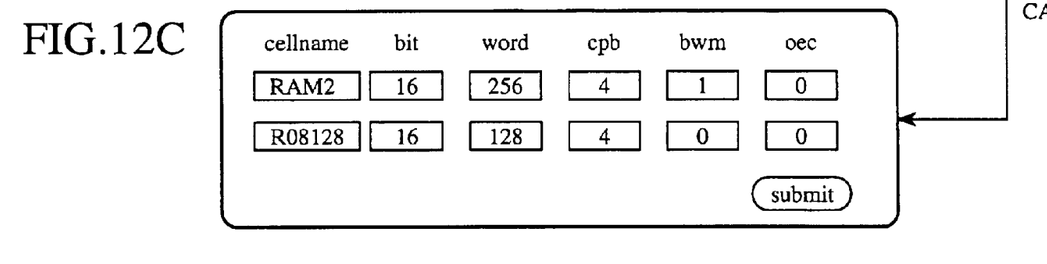

Afterward, when the user corrects part of the selected applied condition data by operating the condition diversion section 29 (see, FIG. 12(c)), the condition diversion section 29 provides the memory compiler 13 with the corrected applied condition data as the generating conditions of the IP design data.

According to the present embodiment 7, it is not necessary for the user to input the generating conditions of the IP design data every time the user wishes to generate the IP design data. Consequently, the present embodiment 7 offers an advantage of being able to reduce the load of the user.

Embodiment 8

In the foregoing embodiments 1–7, the applied condition notifying section 15 transmits the applied condition data indicating the applied condition of the memory compiler 13 to the IP providing apparatus 21. However, such a configuration is also possible in which when the user inputs the urgency and priority of the IP design data by operating the design request section 12, the applied condition notifying section 15 transmits urgency/priority information indicating the urgency and priority of the IP design data so that the master database 22 of the IP providing apparatus 21 manages the urgency/priority information.

For example, the urgency is considered great when the design development step is close to a preproduction/production start date. Thus, the preproduction/production start date can be used as an indicator of the urgency of the IP design data. Accordingly, the applied condition notifying section 15 transmits the preproduction/production start date the user inputs with containing it in the urgency/priority information.

Incidentally, the user can also put the priority of the IP design data into the urgency/priority information by operating the design request section 12. Generally, however, a high priority is assigned when the IP design data is applied to a product, whereas a low priority is given when the IP design data is used for a benchmark test.

The master database 22 of the IP providing apparatus 21 receives the urgency/priority information about the IP design data from the applied condition notifying section 15 of the development apparatus 11, and manages the urgency/priority information.

According to the present embodiment 8, the IP provider can carry out the revision of the memory compiler 13 with reference to the urgency or priority of the IP design data. Consequently, the present embodiment 8 offers an advantage of being able to carry out the revision of the memory compilers 13 sequentially in descending order of urgency or priority.

Embodiment 9

The applied condition notifying section 15 transmits the urgency/priority information to the IP providing apparatus 21 in the foregoing embodiment 8. However, such a configuration is possible in which when the user inputs conditions of a product to which the IP design data is applied by operating the design request section 12, the applied condition notifying section 15 transmits the product application data indicating the conditions, so that the master database 22 of the IP providing apparatus 21 manages the product application data.

According to the present embodiment 9, the IP provider can recognize the delivery conditions of the products applying the IP design data. Accordingly, it offers an advantage of being able to facilitate management of maintenance and licensing agreement.

Embodiment 10

In the foregoing embodiments 1–9, when the transmitting section 25 of the IP providing apparatus 21 receives from the searching section 24 the mail address "mail-address" of the development apparatus 11, it transmits the revision information as to the memory compiler 13 to the development apparatus 11. However, such a configuration is also possible in which the transmitter sends additional information indicating the urgency of the revision information to the development apparatus 11.

For example, when the current revision information to be transmitted requires quick revision of the memory compiler 13 such as for eliminating its defect, the additional information indicating great urgency is transmitted. In contrast, in the case where the user does not think it necessary to revise the memory compiler 13 such as mere upgrading of functions, the additional information indicating small urgency is transmitted.

The present embodiment 10 offers an advantage of being able to reduce the decision load of the user even in the manual mode in which the user provides a revision start command to start the revision of the memory compiler 13 rather than in the automatic mode in which the installer 14 starts the revision automatically when it receives the revision information.

What is claimed is:
1. An intellectual property IP generating system comprising at least one development apparatus and an IP providing apparatus,
said development apparatus including:
IP generating means for generating IP design data in accordance with generating conditions of the IP design data; and applied condition notifying means for transmitting applied condition data indicating an applied condition of said IP generating means, and said IP providing apparatus including:
- management means for managing the applied condition data transmitted from said development apparatus;
- search means for searching for said development apparatus having the IP generating means that must be revised with reference to the associated applied condition data said management means manages; and
- transmission means for transmitting revision information as to the IP generating means to said development apparatus searched for by said search means.

2. The IP generating system according to claim 1, wherein said applied condition notifying means transmits the applied condition data indicating the applied condition of said IP generating means every time said IP generating means generates the IP design data.

3. The IP generating system according to claim 1, wherein said development apparatus further comprises a data storage for temporarily storing the applied condition data indicating the applied condition of said IP generating means when said IP generating means generates the IP design data, and wherein said applied condition notifying means transmits the applied condition data temporarily stored in said data storage.

4. The IP generating system according to claim 1, wherein said IP providing apparatus further comprising an IP generating unit for generating, when said IP generating means before the revision has generated the IP design data that will be affected by the revision of said IP generating means, the IP design data that will be generated by said IP generating means after the revision, and for transmitting the IP design data to said development apparatus searched for by the search means.

5. The IP generating system according to claim 1, wherein said management means manages requirement data indicating requirements of a user, which said associated development apparatus transmits.

6. The IP generating system according to claim 1, wherein said IP providing apparatus further comprises a statistical information display unit for carrying out statistical processing of at least one of the applied condition data and requirement data said management means manages, and for displaying a result of the statistical processing.

7. The IP generating system according to claim 1, wherein said development apparatus further comprises an applied condition display unit for displaying the applied condition data indicating the applied condition of said IP generating means.

8. The IP generating system according to claim 7, wherein said development apparatus further comprises a condition diversion section for accepting a selection of any applied condition data from among the applied condition data said applied condition display unit displays, for accepting correction of the applied condition data, and for supplying said IP generating means with the applied condition data after the correction as the generating conditions of the IP design data.

9. The IP generating system according to claim 1, wherein said management means manages urgency/priority information that indicates urgency/priority of the IP design data and is transmitted from said development apparatus.

10. The IP generating system according to claim 1, wherein said management means manages product application data that indicates a state of a product to which the IP design data is applied, and that is transmitted from said development apparatus.

11. The IP generating system according to claim 1, wherein said transmission means transmits additional information indicating urgency of the revision information of said IP generating means when transmitting the revision information.

* * * * *